United States Patent [19]
Gutzeit et al.

[11] Patent Number: 5,013,097
[45] Date of Patent: May 7, 1991

[54] ANTI-SKID APPARATUS FOR A VEHICLE BRAKE SYSTEM

[75] Inventors: Reinhard Gutzeit, Stuttgart; Wolf-Dieter Jonner, Beilstein Schmidhausen, both of Fed. Rep. of Germany

[73] Assignee: Robert Bosch GmbH, Stuttgart, Fed. Rep. of Germany

[21] Appl. No.: 424,647

[22] Filed: Oct. 20, 1989

[30] Foreign Application Priority Data

Dec. 16, 1988 [DE] Fed. Rep. of Germany ....... 3842370

[51] Int. Cl.$^5$ .......................... B60T 8/58; B60T 13/68
[52] U.S. Cl. ................................ 303/116; 303/DIG. 4
[58] Field of Search ......... 303/113, 116, 119, DIG. 3, 303/DIG. 4

[56] References Cited

U.S. PATENT DOCUMENTS

| | | | |
|---|---|---|---|
| 4,395,073 | 7/1983 | Arikawa et al. | 303/116 |
| 4,421,361 | 12/1983 | Arikawa et al. | 303/116 X |
| 4,453,782 | 6/1984 | Arikawa et al. | 303/119 X |
| 4,703,979 | 11/1987 | Nakanishi | 303/116 |
| 4,755,008 | 7/1988 | Imoto et al. | 303/116 X |
| 4,783,126 | 11/1988 | Arikawa | 303/116 X |
| 4,861,116 | 8/1989 | Bernhardt et al. | 303/110 X |
| 4,861,118 | 8/1989 | Burckhardt et al. | 303/116 X |

FOREIGN PATENT DOCUMENTS 3107963 1/1982 Fed. Rep. of Germany .

Primary Examiner—Robert J. Oberleitner
Assistant Examiner—Alfred Muratori
Attorney, Agent, or Firm—Edwin E. Greigg

[57] ABSTRACT

The invention relates to an anti-skid apparatus operatively positioned between a master brake cylinder and wheel brakes of a vehicle brake system. The anti-skid apparatus protects the wheel brakes from locking. The apparatus includes a controllable master brake line valve, which is open in its basic position and during normal braking; only in anti-skid braking operation does it disconnect the outlet of the return pump from the master brake cylinder.

9 Claims, 3 Drawing Sheets

ANTI-SKID APPARATUS FOR A VEHICLE BRAKE SYSTEM

BACKGROUND OF THE INVENTION

The invention is based on an anti-skid apparatus as described herein.

In a vehicle brake system known from German Offenlegungsschrift 31 07 963, the master brake line valve of the anti-skid apparatus is embodied as a check valve, which is openable upon actuation of the master brake cylinder in the direction of the wheel brakes by means of pressure from the cylinder and which closes when the pressure in the master brake cylinder drops. At the end of braking events, reduction of the pressure prevailing in the wheel brakes is possible only via at least one wheel brake pressure relief line, which bypasses the anti-skid apparatus and has a check valve that can open toward the master brake cylinder. For safety reasons, a closing spring must be incorporated into this check valve; this means that a residual pressure remains in the at least one wheel brake, with the disadvantage that the brake linings of this at least one wheel brake will not reliably separate from their brake disk. This may lead to overheating of the wheel brakes and may cause them to fail; at the very least it causes premature wear of the wheel brake lining.

OBJECT AND SUMMARY OF THE INVENTION

The anti-skid apparatus according to the invention has an advantage that after the termination of braking events, the wheel brakes can be relieved of pressure completely without having to overcome a valve opening resistance. A residual pressure therefore cannot remain in the wheel brakes, so that both overheating of the wheel brakes and needless wear are avoided.

The anti-skid apparatus also as defined has an advantage that an electric control unit, which has a control logic unit and/or a programmed computation unit, can be economically modified to control the master brake line valve. The overall engineering cost for complete, residual-pressure-free pressure reduction in the wheel brakes is relatively low as a result. The modification defined hereinafter has an additional advantage that the master brake line valve can be opened, in order to carry pressure fluid out of the return pump into the master brake cylinder, to enable anti-skid braking operation even with a lighter and therefore inexpensive pressure fluid holder. A pressure fluid holder smaller than those in the prior art also has the advantage that if the return pump does not start up, the brake pedal will not sag as far as usual. Further defined hereinafter is an exemplary embodiment that can be made for instance with an economical pressure switch available on the market. The definitive characteristics revealed have an advantage that an existing movable wall in the pressure fluid holder can be used to drive an electrical signal transducer. Moreover, the definitive characteristics defined herein have an advantage that even a very forceful actuation of the brake pedal will not cause a disadvantageous opening of the pressure limiting valve.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
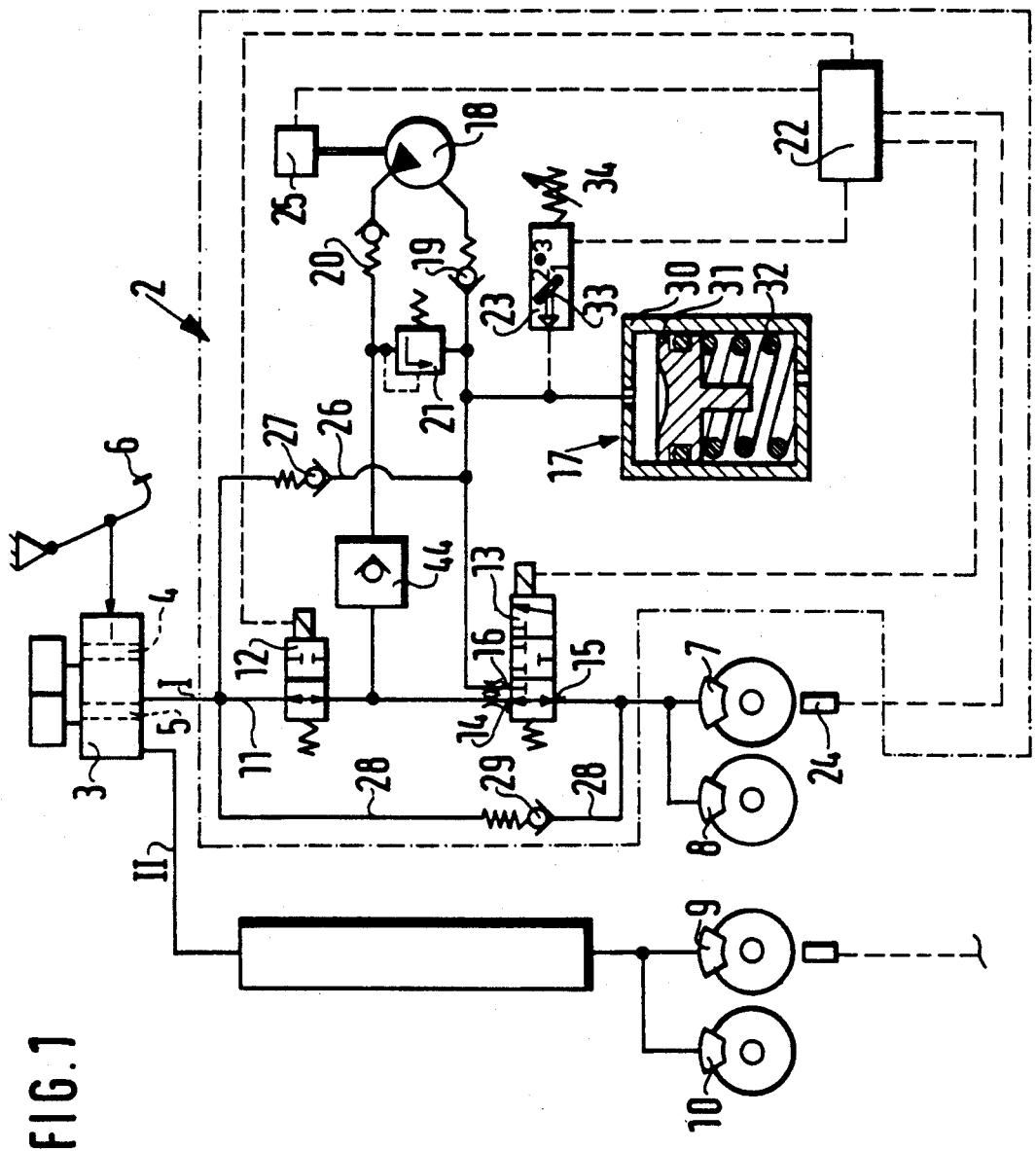
FIG. 1 schematically shows a first exemplary embodiment having a pressure switch.

The first exemplary embodiment of the anti-skid apparatus 2 shown in FIG. 1 is installed in a brake circuit I, which is part of a vehicle brake system. This vehicle brake system includes a dual-circuit master brake cylinder 3 with two master brake cylinder pistons 4 and 5, a brake pedal 6, and wheel brakes 7, 8, 9, 10; the wheel brakes 9 and 10 are part of a second brake circuit II, in which an identically embodied anti-skid apparatus 2 may be installed. The master brake cylinder 3 may be adopted from the prior art and combined for instance with a brake booster, not shown. The wheel brakes 7 and 9 may for instance be associated with the front wheels of a vehicle. Correspondingly, the wheel brakes 8 and 10 are advantageously associated with diagonally opposed wheels. Alternatively, naturally, the wheel brakes 7, 8 and 9, 10 may be embodied as front-wheel and rear-wheel brakes, respectively.

The anti-skid apparatus 2 has a master brake line 11 connected to the master brake cylinder 3; a master brake line valve 12; an anti-skid valve assembly 13, which has an inlet 14, a first outlet 15 and a second outlet 16; a pressure fluid holder 17; a return pump 18 having an inlet 19 and an outlet 20; a pressure limiting valve 21; a safety check valve 44; an electric control unit 22; a pressure switch 23; at least one wheel rotation sensor 24 and one pump drive motor 25; an evacuation line 26 with a built-in one-way valve 27; and a wheel brake pressure relief line 28 having a one-way check valve 29.

The master brake line valve 12 is embodied as a 2/2-way valve that is electromagnetically controllable by means of the control unit 22. The inlet 14 of the anti-skid valve assembly 13 is connected to the master brake line valve 12. The first outlet 15 of this anti-skid valve assembly 13 is permanently connected to the wheel brakes 7 and 8. The anti-skid valve assembly 13 in FIG. 1 is embodied as a 3/3-way valve controllable electromagnetically by means of the control unit 22. Instead, such a 3/3-way magnetic valve, as known from German Offenlegungsschrift 31 07 963, could be replaced with a combination of two more-simply embodied electromagnetically controllable valves. The second outlet 16 of the anti-skid valve assembly 13 communicates with the pressure fluid holder 17, which in a manner known per se may comprise a cylinder 30, a piston 31 and a spring 32. The spring 32 is built into the pressure fluid holder with initial tension and is embodied such that a displacement of the piston 31 counter to the spring 32 is possible by means of a pressure that would not cause skidding of the wheels in braking over a wet, icy surface. The inlet 19 of the return pump 18 is likewise connected to this second outlet 16. The outlet 20 of the return pump 18 is connected via the safety check valve 44 with the inlet 14 of the anti-skid valve assembly 13. The pressure limiting valve 21 is controllable by pressure from the outlet 20 of the return pump 18 and when it opens connects the outlet 20 with the inlet 19 of the return pump 18. The pressure limiting valve 21 is set such that it protects the return pump against an overload. The safety check valve 44 prevents overloading of the pressure limiting valve 21 from excessively high master brake cylinder pressure that might for instance be produced by a muscular driver in a panic braking situation. The pressure switch 23 is connected to the pressure fluid holder 17 and has a contact pad 33 that is actuatable as a function of the pressure prevailing in the pressure fluid holder 17. A spring 34 of the pressure switch 23 is dimensioned such that a movement of the contact pad 33 occurs whenever substantially no volumetric capacity of the pressure fluid holder 17 is left unused. The evacuation line 26 connects the pressure fluid holder 17 with the master brake cylinder 3 via the one-way valve 27. The one-way valve 27 is installed such that it opens toward the master brake cylinder 3 to evacuate the pressure fluid holder 17 when the master brake cylinder 3 is without pressure. The pump drive motor 25 is connected to the control unit 22 and can be switched on by it to drive the return pump 18.

The control unit 22 includes a control logic unit, for evaluating signals from the at least one wheel rotation sensor 24 and the pressure switch 23, and/or has a programmed computer for evaluating these signals and generating control signals for the anti-skid valve assembly 13, master brake line valve 12, and pump drive motor 25. The evaluation of the wheel rotation signals derived from the at least one wheel rotation sensor need not be described here because it is known in the prior art. If the danger of skidding is detected for a wheel that is being braked by the wheel brake 7, the control unit 22 closes the master brake line valve 12; moves the anti-skid valve assembly 13 into its brake pressure reduction position, in which the wheel brake 7 is relieved of pressure to the pressure fluid holder 17 via its the first and second outlet 15 and 16; and puts the return pump 18 into operation. As a result, the return pump 18 draws pressure fluid out of the pressure fluid holder and builds up pressure, which is limited by the pressure limiting valve 21, upstream of the inlet 14 of the anti-skid valve assembly 13. Pressure fluid flowing through the pressure limiting valve 21 can be reaspirated by the return pump 18 through its inlet 19.

If the control unit 22, via the wheel rotation sensor 24, detects that a brake pressure reduction in the wheel brake 7 has at least partially overcome the danger of wheel skidding, then this control unit 22 can direct the anti-skid valve assembly 13 into a brake pressure holding position, preventing further non-braking of the applicable wheel, which could unnecessarily lengthen the braking distance. If the control unit 22 detects that a danger of wheel skidding has been overcome substantially entirely, then it returns the anti-skid valve assembly 13 into its basic position, so that the return pump 18, by means of pressure fluid pumped by it, can increase the brake pressure in the wheel brake 7. Pressure fluid then flows out of the pressure fluid holder 17 to the return pump 18.

The events described above can occur repeatedly, depending on whether the danger of wheel skidding arises again. Accordingly, if no further danger of wheel skidding arises during a selectable period of time, the control unit 22 allows the master brake line valve 12 to return to its open position, so that by the release of the brake pedal 6 a complete pressure relief of both the wheel brake 7 and the wheel brake 8 is possible.

From the above-described control steps it can be seen that when the master brake line 12 is closed, the pressures generated by the return pump 18, which might have a pronounced pulsation, are kept away from the master brake cylinder 3. If the master brake line valve 12 should prove defective during anti-skid braking operation, then with the release of the brake pedal 6 the wheel brake 7 in common with the wheel brake 8 can be largely relieved of pressure, via the wheel brake relief line 28 and the check valve 29, which opens, and as a result the vehicle, when steered, responds at least approximately to the driver's wishes, although in that case actuating the brake pedal again cannot generate any brake pressure in the wheel brakes 7 and 8.

FIG. 1 shows only one wheel rotation sensor 24. Such an arrangement may be sufficient in vehicles that need not meet stringent demands in terms of short braking distances. The use of only one wheel rotation sensor 24 is therefore preferably used for vehicles not having an unusually high top speed. Naturally, it is also possible to assign a wheel rotation sensor to the wheel brake 8 as well, and then, as in the prior art, to trigger the anti-skid valve assembly 13 by the select-high principle, the select-low principle, or by both principles in alternation as needed.

From FIG. 1, it can be seen that in the brake circuit II, which ends at the wheel brakes 9 and 10, an anti-skid apparatus 2 is also installed, which as already noted at the outset may be identical to that described above. A return pump may be combined in the usual manner with the return pump 18, so that a single pump drive motor 25 suffices. The control unit 22 can also be embodied such that it controls both anti-skid apparatuses 2.

In the description of the first exemplary embodiment it was initially assumed that the capacity of the pressure fluid holder 17 was enough to hold the amounts of pressure fluid that were forced into the wheel brakes 7 and 8 upon panic braking in situations with good tire grip on the road, and that would then, if the vehicle encounters an icy surface, be withdrawn from the wheel brakes 7 and 8 in order to drop the brake pressure virtually to nothing. It will be understood that a pressure fluid holder 17 embodied for this kind of high capacity would be large, heavy and expensive. This is where a further concept of the invention comes into play, as already mentioned above. Since it has been found that in anti-skid operation over a road where the tire grip on the surface is constant over relatively long distances, even relatively slight changes in brake pressure in the wheel brakes 7 and 8 will establish an optimal delay in braking, a pressure fluid holder 17 is preferably installed that is less than half as large, by way of example, as a pressure fluid holder of the capacity typical in the prior art as referred to above. As a result, the pressure fluid holder 17, embodied as smaller in accordance with the concept of the invention, becomes lighter and less expensive as well. It will also be understood, however, that in a panic stop over a wet, icy surface, for instance, considerable amounts of pressure fluid must be withdrawn from the wheel brakes 7 and 8, and the pressure fluid holder 17 will not suffice to hold such amounts. As a result, a pressure increase, created by the impending overfilling of the pressure fluid holder 17, exceeds the limit of sensitivity of the pressure switch 23, the movable contact pad 33 of which then reports the exceeding of the previously selected pressure threshold to the control unit 22. The control unit 22 then briefly opens the master brake line valve 12, to allow the return pump 18 to withdraw pressure fluid from the pressure fluid holder 17 and force it into the master brake cylinder 3. Although this causes a brief pressure surge in the master brake cylinder 3, which can be felt at the brake pedal 6, a single such pressure surge or even occasional pressure surges are less disturbing during anti-skid operation than pressure surges in rapid succession, which are to be avoided.

Figure 2:
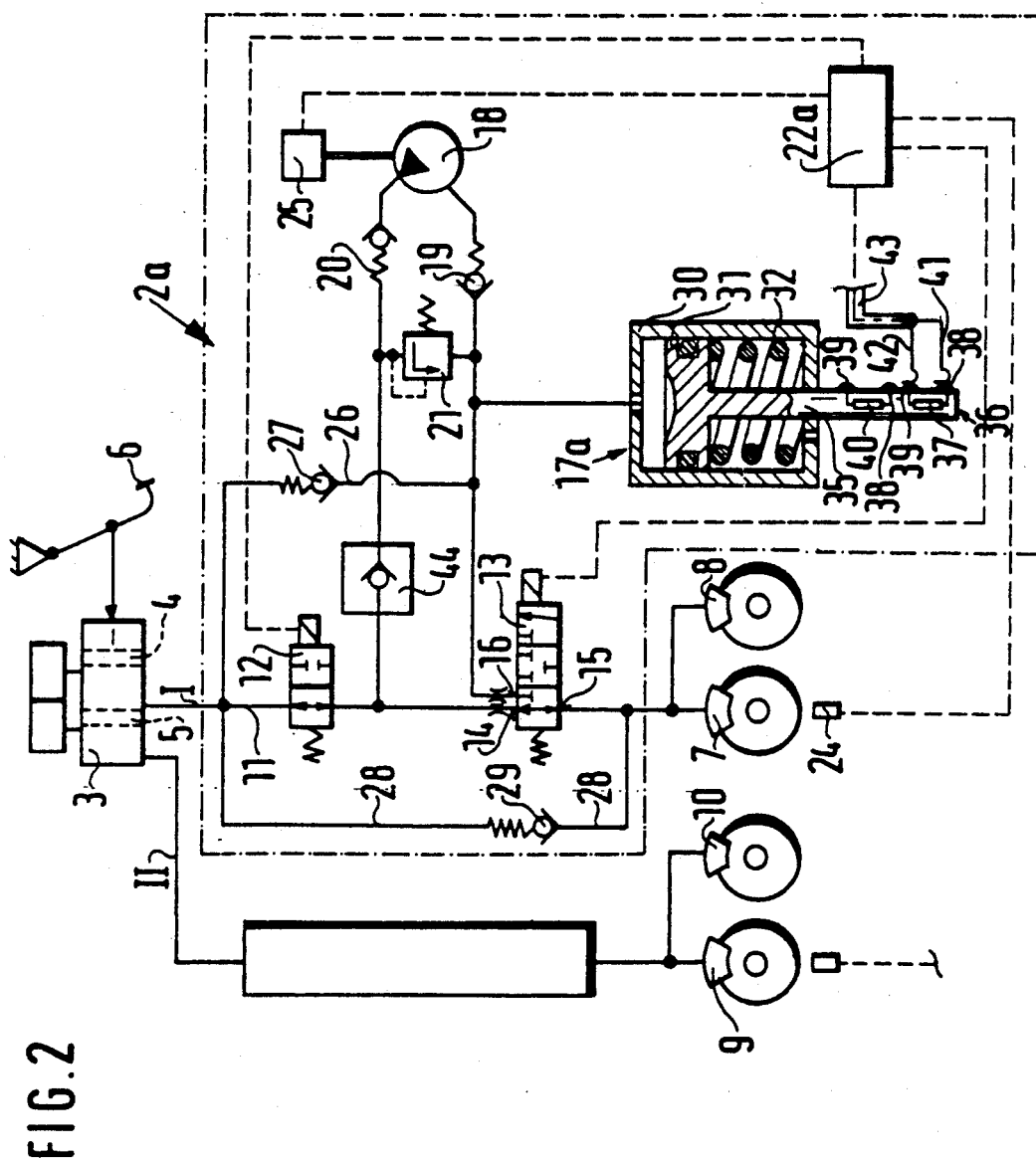
FIG. 2 shows a second exemplary embodiment of the invention having an electrical signal transducer associated with a pressure fluid holder.

The second exemplary embodiment, shown in FIG. 2, of the anti-skid apparatus 2a according to the invention differs from the first embodiment of FIG. 1 in that a pressure fluid holder 17a has a piston rod 35, which protrudes from the cylinder 30 and serves to control a signal transducer 36. The signal transducer 36 replaces the pressure switch 23 of the first embodiment of FIG. 1.

The signal transducer 36 includes a first electrical resistor 37, which is secured to the piston rod 35 and is connected to two contacts 38, 39; a second electrical resistor 40, which is likewise secured to the piston rod 35 and is connected to further contacts 38 and 39; and two contact springs 41 and 42, which are advantageously connected to the control unit 22a via a coaxial line 43. Each of the two pairs of contacts 38, 39 has the same contact spacing. The resistances of the two resistors 37 and 40 differ, so that with different alignments of the piston rod 36 the control unit 22a can detect which of the two resistors 37 or 40 is connected, via its contacts 39 and 39 and the contact springs 41 and 42, to the coaxial line 43. In FIG. 2, the piston 31 and hence the piston rod 35 as well are located in the basic position, in which the pressure fluid holder 17a holds the smallest possible amount of pressure fluid. From the electrical resistance of the first electrical resistor, the control unit 22a recognizes that the piston 31 is in the basic position, shown. If a required reduction of brake pressure in the wheel brakes 7 and 8 switches the anti-skid valve assembly 13 into the brake pressure reduction position, pressure fluid flows out of the wheel brakes 7 and 8 into the pressure fluid holder 17a and displaces its piston 31 counter to the force of the spring 32. To compress the spring 32, a pressure increase is required. Hence there is a direct relationship between this pressure increase and the amounts of pressure fluid received by the pressure fluid holder 17a. If the pressure fluid holder 17a is filled nearly to capacity counter to the resistance of the spring 32, then by displacement of the piston rod 35 the contacts 38 and 39 of the second electrical resistor 40 come to be aligned with the contact springs 41 and 42. The control unit 22a then recognizes that the contact springs 41 and 42 are spanned by a different resistance, namely a second electrical resistance. As a result, the control unit 22a recognizes that the capacity of the pressure fluid holder 17a is being used essentially in full, and therefore the master brake line valve 12 must be at least briefly opened, to allow the possibility of a further pressure reduction in the wheel brakes 7 and 8 that might still become necessary.

In both exemplar embodiments described, as shown in FIGS. 1 and 2, provision is accordingly made by engineering means to enable using a small, light pressure fluid holder 17 or 17a, and to direct the amounts of pressure fluid that are to be withdrawn from the wheel brakes 7 and 8 to avoid wheel skidding either to the pressure fluid holders 17 or 17a, or to these pressure fluid holders and additionally to the master brake cylinders 3.

Figure 3:
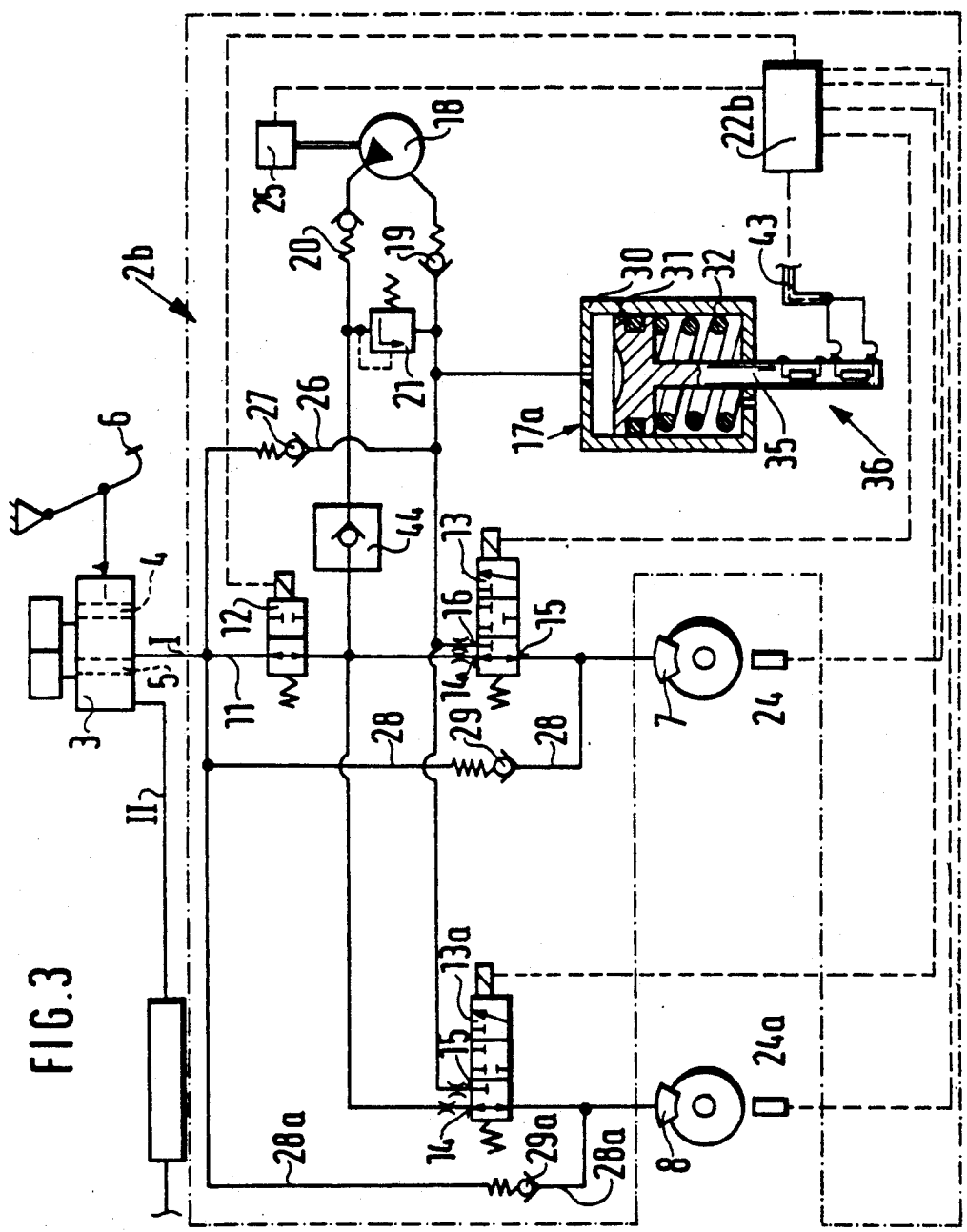
FIG. 3 shows a further exemplary embodiment, which has an electrical signal transducer controllable by the pressure fluid holder.

The third exemplary embodiment of the anti-skid apparatus 2b of FIG. 3 has, in addition to the anti-skid valve assembly 13, a second anti-skid valve assembly 13a parallel to it; also, only the wheel brake 7 is connected to the first anti-skid valve assembly 13, while the other wheel brake 8 is connected to the second anti-skid valve assembly 13a. The second anti-skid valve assembly 13a, like the first, has its inlet 14 connected to the master brake line valve 12. Analogously to the wheel brake relief line 28 of the wheel brake 7, a separate wheel brake relief line 28a leads from the wheel brake 8 to the master brake cylinder 3 via a check valve 29a. The task of the wheel brake relief line 29a and the check valve 28 is the same as the one, already described, assigned to the wheel brake relief line 28 and its check valve 28. A second wheel rotation sensor 24a is also provided, associated with the wheel brake 8. Consequently the wheel rotation behavior of the wheels associated with the wheel brakes 7 and 8 is detectable individually by means of these wheel rotation sensors 24 and 24a. Correspondingly, the control unit 22b of the third exemplary embodiment is modified over the control unit 22a of the second exemplary embodiment such that by triggering the first anti-skid valve assembly 13 and the second anti-skid valve assembly 13a independently of one another, it can vary the brake pressures in the wheel brakes 7 and 8 independently of one another, to present the danger of wheel skidding. Regardless of whether amounts of pressure fluid originating in the wheel brake 7 or the wheel brake 8, or both wheel brakes jointly, would cause the capacity of the pressure fluid holder 17a to be used up, with such an arrangement the signal transducer 36 will still report this situation to the control unit 22b, causing it once again, at least brief to temporarily rescind the closure of the master brake line valve 12 tripped by the anti-skid operation, in order to at least partly empty the pressure fluid holder 17a. Finally, and this is equally applicable to all three exemplary embodiments, if the absence of a danger of wheel skidding causes amounts of pressure fluid to be displaced back into the master brake cylinder by the return pump 18, causing the master brake line valve 12 to move into its basic position, i.e. the opening position, it is once again possible to supply pressure fluid to the wheel brakes 7 and 8, using the master brake cylinder 3 and the amounts of pressure fluid it contains.

As already noted, a pressure fluid holder 17a having an electrical signal transducer 36 can replace a more-simply embodied pressure fluid holder 17 having an associated pressure switch 23. Conversely, in the third exemplary embodiment shown in FIG. 3, the pressure fluid holder 17a can be preplaced for a simpler pressure fluid holder 17 and the already described pressure switch 23.

An anti-skid apparatus 2b is also shown for the brake circuit II of the third exemplary embodiment. Because of the internal structure of this anti-skid apparatus 2b, the brake pressures of two wheel brakes would once again be variable independently. If these wheel brakes are associated with a rear axle, then the expense for an anti-skid apparatus embodied with two anti-skid valve assemblies 13 and 13a is usually not worthwhile, so that to lower the cost, recourse can be made to simpler anti-skid apparatuses 2 or 2a as shown in FIGS. 1 and 2.

The foregoing relates to preferred exemplary embodiments of the invention, it being understood that other variants and embodiments thereof are possible within the spirit and scope of the invention.

What is claimed and desired to be secured by letters patent of the United States is:

1. An anti-skid apparatus operatively positioned between a master brake cylinder and at least one wheel brake controlled by a braking circuit of a vehicle; having an inlet of a master brake line valve (12) connected to an outlet side of the master brake cylinder; at least one electrically controllable anti-skid valve assembly (13) having an inlet (14) connected to an outlet side of said master brake line valve, said anti-skid valve assembly having a first and second outlet, said first outlet (15) communicating with said at least one wheel brake; said second outlet (16) communicating with a pressure fluid holder (17), a return pump (18) that has an inlet communicating with said second outlet of said anti-skid valve assembly, said return pump having an outlet communicating with said inlet of the anti-skid valve assembly; a pressure limiting valve (21) that communicates with said outlet of said return pump, said pressure fluid holder (17), and said inlet of said return pump; an electrical control unit connected to said master brake line valve (12) for controlling said master brake line valve (12) and said anti-skid valve assembly; and at least one wheel brake relief line (28) which bypasses said anti-skid valve assembly and said master brake line valve; said at least one wheel brake relief line is equipped with a one-way check valve (29) that opens toward said master brake cylinder; said master brake line valve (12) is embodied as an electromagnetically controllable 2/2-way valve, which is open in its basic position and assumes its closing position in anti-skid braking operation, further said master brake line valve (12) is disposed between said outlet of said return pump (18) and said master brake cylinder, whereby a flow of pressure fluid pumped by said return pump (18) in ABS operation can only reach the inlet of said valve assembly (13), and the pressure fluid holder (17) through said pressure limiting valve (21).

2. An anti-skid apparatus as defined by claim 1, which includes a safety check valve (44) in a line between said outlet (20) of the return pump (18) and said inlet (14) of said anti-skid valve assembly as well as between the outlet from said master brake line valve (12) and an inlet to said pressure limiting valve (21); and said safety check valve (44) is openable toward said inlet (14) of said anti-skid valve assembly.

3. An anti-skid apparatus as defined by claim 1, in which the anti-skid apparatus is operatively positioned to control more than at least one wheel brake.

4. An anti-skid apparatus operatively positioned between a master brake cylinder and at least one wheel brake controlled by a braking circuit of a vehicle; having an inlet of a master brake line valve (12) connected to an outlet side of the master brake cylinder; at least one electrically controllable anti-skid valve assembly (13) having an inlet (14) connected to an outlet side of said master brake line valve, said anti-skid valve assembly having a first and second outlet, said first outlet (15) communicating with said at least one wheel brake; said second outlet (16) communicating with a pressure fluid holder (17), a return pump (18) that has an inlet communicating with said second outlet of said anti-skid valve assembly, said return pump having an outlet communicating with said inlet of the anti-skid valve assembly; a pressure limiting valve (21) that communicates with said outlet of said return pump, said pressure fluid holder (17); and said inlet of said return pump; an electrical control unit connected to said master brake line valve (12) for controlling said master brake line valve (12) and said anti-skid valve assembly; and at least one wheel brake relief line (28) which bypasses said anti-skid valve assembly and said master brake line valve; said at least one wheel brake relief line is equipped with a one-way check valve (29) that opens toward said master brake cylinder; said master brake line valve (12) is embodied as an electromagnetically controllable 2/2-way valve, which is open in its basic position and assumes its closing position in anti-skid braking operation, and includes means (23, 33; 36, 37, 40) that responds as a function of pressure, which communicates with said inlet of said return pump (18) and are arranged to emit and communicate electrical signals to said control unit (22, 22a, 22b); said control unit then communicates a signal to said master brake line valve (12) to open the master brake line valve (23) which is provided with a signal representing a predetermined pressure indicative that a depletion of the capacity of the pressure fluid holder (17, 17a) is expected.

5. An anti-skid apparatus as defined by claim 4, in that said means responsive to pressure are embodied as a pressure switch (23).

6. An anti-skid apparatus as defined by claim 5, which includes a safety check valve (44) in a line between said outlet (20) of the return pump (18) and said inlet (14) of said anti-skid valve assembly as well as between the outlet from said master brake line valve (12) and an inlet to said pressure limiting valve (21); and said safety check valve (44) is openable toward said inlet (14) of said anti-skid valve assembly.

7. An anti-skid apparatus as defined by claim 4, in which said pressure fluid holder (17a) is equipped with a movable wall, elastically deflecting under pressure, and that this wall is coupled to at least one electrical signal transducer (36, 37, 40).

8. An anti-skid apparatus as defined by claim 7, which includes a safety check valve (44) in a line between said outlet (20) of the return pump (18) and said inlet (14) of said anti-skid valve assembly as well as between the outlet from said master brake line valve (12) and an inlet to said pressure limiting valve (21); and said safety check valve (44) is openable toward said inlet (14) of said anti-skid valve assembly.

9. An anti-skid apparatus as defined by claim 4, which includes a safety check valve (44) in a line between said outlet (20) of the return pump (18) and said inlet (14) of said anti-skid valve assembly as well as between the outlet from said master brake line valve (12) and an inlet to said pressure limiting valve (21); and said safety check valve (44) is openable toward said inlet (14) of said anti-skid valve assembly.

* * * * *